United States Patent [19]
Pearson

[11] 4,311,635
[45] Jan. 19, 1982

[54] FLAME RESISTANT THERMOPLASTIC ELASTOMER

[75] Inventor: Stanley Pearson, Trenton, N.J.

[73] Assignee: Pantasote Inc., Greenwich, Conn.

[21] Appl. No.: 180,927

[22] Filed: Aug. 25, 1980

[51] Int. Cl.³ ............................................... C08K 3/34
[52] U.S. Cl. .................................................. 260/42.49
[58] Field of Search ..................... 260/42.49; 525/222

[56] References Cited

U.S. PATENT DOCUMENTS

| | | | |
|---|---|---|---|
| 3,517,083 | 6/1970 | Salyer | 525/222 |
| 3,546,158 | 12/1970 | Champion et al. | 260/42.49 |
| 3,827,997 | 8/1974 | Bergomi | 260/42.49 |

*Primary Examiner*—Lewis T. Jacobs
*Attorney, Agent, or Firm*—Jacobs & Jacobs

[57] ABSTRACT

An elastomeric thermoplastic graft terpolymer of vinyl chloride and an ethylene-vinyl acetate copolymer containing kaolin, talc, silica or alumina as a flame retardant, smoke and soot-inhibiting filler and, conventionally, a flame retardant.

16 Claims, No Drawings

FLAME RESISTANT THERMOPLASTIC ELASTOMER

The present invention relates to flame-retardant graft copolymers, and more particularly to graft terpolymers of vinyl chloride and ethylene-vinyl chloride and ethylene-vinyl acetate copolymers compounded to have excellent flame retardancy and reduced smoke and soot generation.

U.S. Pat. No. 3,517,083 to Salyer describes polyblends obtained by intimately blending a vinyl chloride polymer, such as polyvinyl chloride (PVC), with a solid ethylene-vinyl acetate (EVA) copolymer having a combined vinyl acetate content of 15–85% by weight. Such blends include graft copolymers of PVC and EVA. The disclosure of Salyer, U.S. Pat. No. 3,517,083 is incorporated herein by reference thereto.

There is presently a need for a flame retardant, low smoke and soot plastics material that has elastomeric properties. While fluorinated polymers, such as polytetrafluoroethylene, possess excellent flame retardant qualities, and are used in applications, such as electrical insulation, where flame retardance is important, nevertheless such fluorinated polymers are expensive. The present invention, in its most preferred aspect, provides an elastomeric, flame retardant and low smoke and soot plastics material having excellent physical properties and aging characteristics. This new material has the capability of replacing fluorinated polymers for many uses.

The present invention broadly provides a flame retardant, low smoke and soot polymeric composition comprising:

1. A polymeric composition, comprising
   (1) a graft terpolymer of:
      (a) from about 40 to about 60 parts by weight of a mixture from about 85 to about 100% by weight of vinyl chloride and from 0 to about 15% by weight of a copolymerizable monomer; graft copolymerized to
      (b) from about 60 to about 40 parts by weight of a solid ethylene-vinyl acetate copolymer containing from about 15 to about 95% by weight of combined ethylene and the balance vinyl acetate; and
   (2) from about 5 to about 100 parts by weight, per hundred parts by weight of the graft terpolymer, of a flame retardant, smoke and soot-inhibiting filler selected from the group concisting of kaolin, talk, silica or alumina.

Preferably, the composition also contains (3) from about 0.1 to about 20 parts by weight, per hundred parts by weight of the graft terpolymer, of a flame retardant. Together the flame retardant and the specified fillers provide an elastomeric PVC/EVA graft terpolymer with low flammability and low (or no) smoke generation when burned.

Examination of the flammability and smoke generation of PVC resin and EVA copolymer shows that PVC is relatively non-flammable, but it generates a great amount of smoke while burned whereas EVA copolymer is relatively flammable but it burns without smoke. The PVC/EVA graft terpolymer is relatively flammable and generates a great amount of smoke, thus picking up the worst attributes of its two components. Neither the PVC nor the EVA copolymer component shows any significant change in flame retardancy and no change in smoke and soot generation when the specified filler (2) is added, with or without a flame retardant. Indeed, the addition of a flame retardant itself exhibits little change in the properties of the PVC and EVA copolymer. However, it has now been discovered that the addition of the specified filler (2) greatly increases the flame retardancy and decreases the smoke and soot generation of the PVC/EVA graft terpolymer, an effect which is increased when a flame retardant is also added. In addition, the use of the specified filler, and, preferably, the flame retardant, does not deleteriously affect the desirable physical properties of the PVC/EVA graft terpolymer.

PVC/EVA graft terpolymer is prepared by graft copolymerizing vinyl chloride (and any copolymerizable monomer) and EVA copolymer using free radical graft copolymerization techniques. See, e.g., "Graft Copolymerization of Vinyl Compounds on Ethylene-Vinyl Acetate Copolymers", Herbert Barth and Dietrich Hardt, Advances In Chemistry Series, Number 91, 1969, American Chemical Society, as well as the Salyer patent. For simplicity, these graft terpolymers will be referred to as PVC/EVA graft terpolymers, but it is to be understood that some of the combined vinyl chloride (and copolymerizable monomer when present) may be present as PVC homopolymer (or copolymer) that is not grafted to the EVA copolymer but is nevertheless intimately linked to the EVA copolymer, as is conventional in graft copolymer systems. Some EVA copolymer will also be ungrafted but will be intimately linked to the graft terpolymer system as a whole.

To form the PVC/EVA graft terpolymer, a monomer system consisting of from about 85 to about 100% by weight of vinyl chloride and up to about 15% by weight of one or more copolymerizable monomers, e.g., vinyl acetate, vinylidene chloride, diethyl maleate, diethyl fumarate, etc. is employed. This is graft copolymerized with the solid EVA, which consists essentially of from about 15 to about 95% by weight of combined ethylene and from about 85 to about 5% by weight of combined vinyl acetate. The EVA copolymer, which can be prepared by any conventional technique, usually has a weight average molecular weight of 15,000–500,000, preferably 50,000–200,000. EVA copolymers having combined vinyl acetate contents of from about 40 to about 70% are preferred.

The presently preferred graft terpolymers are PVC/EVA graft terpolymers of 47% EVA copolymer (55% ethylene-45% vinyl acetate) and 53% PVC; 50% EVA copolymer (48% ethylene-52% vinyl acetate) and 50% PVC; and 57% EVA copolymer (48% ethylene-52% vinyl acetate) and 43% PVC.

The flame-retardant, smoke and soot reducing fillers used in this invention, are all readily available. Kaolin is sold commercially in calcined and non-calcined form, and both forms are useful, but it is presently preferred to use hydrated kaolin, since this gives the best results of all of the fillers. Hydrated kaolin is kaolin in its natrual form, which usually has an alumina content of from about 35 to about 40%, a silica content of from about 40 to about 50% and an ignition loss of from about 10 to about 15%. The hydrated kaolin is to be distinguished from dehydroxylated, calcined or other heat treated kaolin used in industry from which water of hydration has been removed and which have essentially no ignition loss. Freeport Kaolin Company sells water washed, hydrated kaolin under trade names Catalpo Clay and Buca Clay, and both are preferred for use in this invention. Freeport Kaolin Company also sells various calcined kaolins.

The talc used in the present invention is a conventional magnesium silicate containing primarily silica, MgO and small quantities of various metal oxides and alumina. Talc sold for use as fillers for plastics is satisfactory. Similarly, the silica and alumina used in the invention are conventional $SiO_2$ and $Al_2O_3$ used as fillers for plastics.

To aid in blending the kaolin, talc, silica or alumina into PVC/EVA graft terpolymer, it is desirable to use fine particles for the desired fillers, as is known. Colloidal size particles, such as less than a few microns, are desirable. A range of from about 0.001 to about 20 microns is useful, with less than about 5 microns being preferred.

Generally, the designated filler is used in an amount of about 5 to about 100, preferably from about 10 to about 80, parts by weight of the filler per hundred parts by weight of the graft terpolymer. Amounts larger than 100 parts can be used, but the risk is that such excessive amounts may adversely affect the properties of the graft terpolymer. In general, the amount of filler, and flame retardant when employed, will not exceed the amount that is effective to decrease flammability and smoke. When the filler is employed by itself, it is found that higher loadings, such as from about 50 to about 100 parts, per hundred parts of the graft terpolymer, are generally required to reduce smoke to acceptable levels.

The flame retardant employed in the invention can by any of the conventional organic or inorganic flame retardants, such as chlorinated or brominated hydrocarbons, halogenated or non-halogenated organophosphorous compounds, antimony compounds, e.g., antimony trioxide or pentaoxide, zinc compounds, molybdenum compounds and the like. Antimony oxides, particularly antimony trioxide, are presently preferred. Usually an amount of from about 0.1 to about 20, preferably from about 1 to about 10 parts of flame retardant per hundred parts of the graft terpolymer is employed.

Precise and preferred amounts of the filler and flame retardant can be readily determined empirically within the guidelines set forth above. It is presently preferred to use from about 2 to about 10 parts of antimony oxide, preferably antimony trioxide, together with from about 20 to about 80 parts of filler, preferably hydrated kaolin, per hundred parts of the graft terpolymer.

The following examples illustrate the present invention. In these examples and in the specification and appended claims, all parts, proportions and percentages are by weight unless otherwise stated.

EXAMPLE 1

Three graft terpolymers of vinyl chloride and EVA copolymer were prepared in Runs 1, 2 and 3 as follows. In each Run, vinyl chloride monomer, 3262 parts, and EVA copolymer, 2563 parts, were charged into a reaction vessel along with azobisisobutyronitrile, 3.1 parts, a suspending agent (PVA, 6.6 parts), sodium bicarbonate, 2.9 parts, and heptane, 58.0 parts. Water was added in an amount of 9163 parts and the contents in the vessel were heated to 95° F. under vacuum with stirring for 4½ hours, after which time the temperature was raised to 140° F. When the pressure falls to the predetermined value, the vessel is cooled and vented and the resulting graft terpolymer is recovered, steam stripped and dried. In Run 1, and EVA copolymer of 55% ethylene/45% vinyl acetate was used, and the recovery pressure was 40 psig. In Runs 2 and 3, the EVA copolymer was 48% ethylene/52% vinyl acetate. The recovery pressure was 40 psig for Run 2 and 60 psig for Run 3. Table A identifies the graft terpolymers obtained.

TABLE A

| GRAFT TERPOLYMERS | | | |
|---|---|---|---|
| RUN | 1 | 2 | 3 |
| % PVC | 53 | 50 | 43 |
| % EVA | 47 | 50 | 57 |
| % Combined Ethylene | 55 | 48 | 48 |
| % Combined Vinylacetate | 45 | 52 | 52 |

EXAMPLE 2

The terpolymer of Run 1 of Example 1, PVC and the EVA copolymer used to make the terpolymer of Run 1 were each compounded with:

| Parts per hundred parts of resin | |
|---|---|
| 5.00 | Dibasic lead phthalate (stabilizer) |
| 0.25 | Stearic acid (lubricant) |
| 2.00 | Sterically hindered phenol (Irganox 1010, anti-oxidant). |
| 1.50 | EVA/carbon black (color concentrate). |

These resins were then further compounded as follows. A sample of each resin containing no flame retardant or filler was designated as control. Samples of each resin were blended with flame-retardant and/or filler in the amount set forth in Table I, and these samples and the controls were tested for oxygen index, a measure of flame retardance, using the procedures of ASTM D-2863. The smoke and soot generation during the test procedure was observed and noted. The results of these tests are reports in Tables I, II, III and IV below.

TABLE I

| Sample | Control | Identification Of Additives | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| Antimony Oxide | — | 3 | 5 | — | — | 3 | 3 | — | — | 3 | 3 | — | — | 3 | 3 |
| Calcium Carbonate | — | — | — | — | — | — | — | 25 | 50 | 25 | 50 | — | — | — | — |
| Hydrated Kaolin | — | — | — | 25 | 50 | 25 | 50 | — | — | — | — | — | — | — | — |
| Hydrated $Al_2O_3$ | — | — | — | — | — | — | — | — | — | — | — | 25 | 50 | 25 | 50 |

TABLE II

| Additive Sample | Control | Additive Plus Graft Terpolymer | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| Oxygen Index | 23 | 28 | 30 | 29 | 32 | 35 | 39 | 24 | 24 | 28 | 26 | 25 | 32 | 32 | 38 |
| Smoke | G | S | S | S | L | L | N | G | S | S | S | G | S | G | S |

TABLE II-continued

| | Additive Plus Graft Terpolymer | | | | | | | | | | | | | | |
|---|---|---|---|---|---|---|---|---|---|---|---|---|---|---|---|
| Additive Sample | Control | 1 | 2 | 3 | 4 | 5 | 6 | 7 | 8 | 9 | 10 | 11 | 12 | 13 | 14 |
| Soot | G | S | S | L | N | L | N | S | S | S | S | G | S | G | S |

Key To Abbreviations
G = Great Amount
S = Some
L = Little
N = None

TABLE III

| | Additive Plus PVC | | | | | | | | | | | | | | |
|---|---|---|---|---|---|---|---|---|---|---|---|---|---|---|---|
| Additive Sample | Control | 1 | 2 | 3 | 4 | 5 | 6 | 7 | 8 | 9 | 10 | 11 | 12 | 13 | 14 |
| Oxygen Index | 45 | >48 | >48 | >48 | >48 | >48 | >48 | >48 | >48 | >48 | >48 | >48 | >48 | >48 | >48 |
| Smoke | G | G | G | G | G | G | G | G | G | G | G | G | G | G | G |
| Soot | G | G | G | G | G | G | G | G | G | G | G | G | G | G | G |

Key To Abbreviations
G = Great Amount
S = Some
L = Little
N = None

TABLE IV

| | Additive Plus EVA Copolymer | | | | | | | | | | | | | | |
|---|---|---|---|---|---|---|---|---|---|---|---|---|---|---|---|
| Additive Sample | Control | 1 | 2 | 3 | 4 | 5 | 6 | 7 | 8 | 9 | 10 | 11 | 12 | 13 | 14 |
| Oxygen Index | 18 | 19 | 19 | 20 | 20 | 21 | 21 | 18 | 19 | 20 | 20 | 19 | 20 | 20 | 20 |
| Smoke | N | N | N | N | N | N | N | N | N | N | N | N | N | N | N |
| Soot | N | N | N | N | N | N | N | N | N | N | N | N | N | N | N |

Key To Abbreviations
G = Great Amount
S = Some
L = Little
N = None

The oxygen index measures the percent oxygen in a mixture of oxygen and nitrogen required for combustion. An oxygen index of 20 or less means that the material is flammable in air. Generally, an oxygen index of 28 is practical for flame retardancy, while an oxygen index of 32 or more is excellent.

As can be seen, the use of a flame retardant and/or filler has little (if any) effect on flammability and smoke generation of the PVC and EVA copolymer (Tables III and IV). Further, the use of flame retardant alone (samples 1 and 2, Table II) gives some improvement in flame retardancy and smoke and soot generation of the PVC/EVA graft terpolymer, but the product is only marginally acceptable. The use of hydrous kaolin alone (samples 3 and 4, Table II) reduces smoke in the terpolymer, particularly at the higher loading, and gives acceptable flammability. Quite surprisingly, the joint use of flame retardant and hydrous kaolin (samples 5 and 6, Table II) give dramatic reduction of flammability with little or no smoke and soot.

Table II also shows that hydrated alumina requires a higher loading when used alone (sample 11) or even in combination with the flame retardant in order to effect reduction in smoke and soot.

The hydrated kaolin used in this Example was Catalpo clay sold by Freeport Kaolin Company.

It is noted that calcium carbonate (samples 7-10) which is a commonly employed filler, does not even approach the results obtained by the present invention, either alone or with the flame retardant.

EXAMPLE 3

Samples of the resins of Example 2 containing the stabilizer, lubricant, anti-oxidant and color concentrate, were compounded with a flame retardant and a filler as set forth in Table V below. The compounded resins were then tested as in Example 2 with the results set forth in Tables VI, VII and VIII below.

TABLE V

| | Identification Of Additives | | | | | | | | | |
|---|---|---|---|---|---|---|---|---|---|---|
| Sample | Control | 15 | 16 | 17 | 18 | 19 | 20 | 21 | 22 | 23 | 24 |
| Antimony Oxide | — | 3 | 3 | 3 | 3 | 3 | 3 | 3 | 3 | 3 | 3 |
| SP33 Clay | — | — | — | — | — | 25 | 50 | — | — | — | — |
| Translink 37 Clay | — | — | — | — | — | — | — | 25 | 50 | — | — |
| Whitetex Clay | — | — | — | — | — | — | — | — | — | 25 | 50 |
| Silica | — | 25 | 50 | — | — | — | — | — | — | — | — |
| Talc | — | — | — | 25 | 50 | — | — | — | — | — | — |

TABLE VI

| | Additive Plus Graft Terpolymer | | | | | | | | | |
|---|---|---|---|---|---|---|---|---|---|---|
| Additive Sample | Control | 15 | 16 | 17 | 18 | 19 | 20 | 21 | 22 | 23 | 24 |
| Oxygen Index | 23 | 35 | 37 | 34 | 35 | 34 | 37 | 32 | 35 | 33 | 38 |
| Smoke | G | L | L | S | L | S | S | S | S | S | S |
| Soot | G | L | L | S | L | S | L | S | S | S | S |

Key To Abbreviations
G = Great Amount
S = Some
L = Little
N = None

TABLE VII

| Additive Sample | Control | Additive Plus PVC | | | | | | | | |
|---|---|---|---|---|---|---|---|---|---|---|
| | | 15 | 16 | 17 | 18 | 19 | 20 | 21 | 22 | 23 | 24 |
| Oxygen Index | 45 | >48 | >48 | >48 | >48 | >48 | >48 | >48 | >48 | >48 | >48 |
| Smoke | G | G | G | G | G | G | G | G | G | G | G |
| Soot | G | G | G | G | G | G | G | G | G | G | G |

Key To Abbreviations
G = Great Amount
S = Some
L = Little
N = None

TABLE VIII

| Additive Sample | Control | Additive Plus EVA Copolymer | | | | | | | | |
|---|---|---|---|---|---|---|---|---|---|---|
| | | 15 | 16 | 17 | 18 | 19 | 20 | 21 | 22 | 23 | 24 |
| Oxygen Index | 18 | 20 | 20 | 19 | 21 | 20 | 20 | 19 | 21 | 20 | 20 |
| Smoke | N | N | N | N | N | N | N | N | N | N | N |
| Soot | N | N | N | N | N | N | N | N | N | N | N |

Key To Abbreviations
G = Great Amount
S = Some
L = Little
N = None

As in the case of Example 2, the filler and flame retardant have no significant affect on the PVC and EVA copolymer (Tables VII and VIII, but they dramatically decrease flammability and smoke and soot generation in the graft terpolymer. All of samples 15-24 of Table VI have excellent flame retardancy with reduced smoke and soot generation.

The clays of samples 19-24 are all made by Freeport Kaolin Company, New York, N.Y. and are each heat treated (calcined) to remove water of hydration. This can be seen from comparing the ignition loss of the hydrated kaolin of samples 3-6 of Example 2, which is 13.7%, to the ignition loss of SP 33 clay (0.7%), Translink 37 (0.20%) and Whitetex clay (0.1%). The ignition losses of 0.1% to 0.7% indicate that water of hydration has been removed from the calcined kaolins.

The silica used in Example 3 was Cab-O-Sil M-5, Cabot Chemical Company, and the talc was Desertalc No. 50, Desert Minerals, Inc.

EXAMPLE 4

The graft terpolymer of Run 1 of Example 1, was compounded with the same stabilizer, lubricant, anti-oxidant and color concentrate specified in Example 1, and in the same amounts, along with 3 parts of antimony trioxide per hundred parts of terpolymer. The resulting composition was designated as Terpolymer X. Samples of Terpolymer X were blended with varying amounts of hydrated kaolin and tested for flame retardancy and smoke generation using the Monsanto Tunnel Test. This test uses the equipment and procedure of ASTM E-84-70 tunnel test, except the tunnel is 2 feet long and the sample is 9 inches long. The results are reported in Table IX below.

TABLE IX

MONSANTO TUNNEL TEST

| Sample | Hydrated Kaolin (phr) | Flame (inch) | Flame Spread (%) | Light Transmission (%) | Smoke Count |
|---|---|---|---|---|---|
| Terpolymer X | 0 | 4½ | 48 | 75 | 913 |
| " | 10 | 2 | 22 | 85 | 733 |
| " | 20 | 2 | 22 | 94 | 421 |
| " | 30 | 1½ | 15 | 98 | 317 |
| " | 40 | 1 1/16 | 13 | 97 | 375 |
| " | 50 | 1 | 11 | 97 | 395 |
| Asbestos | — | 0 | 0 | 99 | 188 |
| Red Oak | — | 9 | 100 | 33 | 2875 |

The tunnel test uses asbestos and red oak as opposite ends of the flammability and smoke generation scale. With as little as 10 phr (parts per hundred parts of resin), of hydrated kaolin, the flame retardancy of Terpolymer X more than doubled and the smoke generation was reduced. At 20 phr, the hydrated kaolin reduced the smoke generation to practically zero. At 50 phr, the hydrated kaolin provided Terpolymer X with asbestos-like properties.

EXAMPLE 5

The terpolymer of Run 3 of Example 1 was compounded with the same stabilizer, lubricant, anti-oxidant and color concentrate as in Example 1 and in the same amounts as Example 1 except that 7 phr of stabilizer and 1.5 parts of color concentrate was used. This was blended with 3 phr of antimony trioxide to give Terpolymer Y. Terpolymer X of Example 5 and Terpolymer Y were blended with hydrated kaolin and tested in the Arapahoe Smoke Chamber. PVC was used for comparison. The results are reported in Table X below.

TABLE X

Arapahoe Smoke Chamber

| | Hydrated Kaolin (phr) | Smoke % | Char % |
|---|---|---|---|
| Terpolymer X | 30 | 5.4 | 26.8 |
| Terpolymer Y | 50 | 4.5 | 31.4 |
| PVC | — | 8.4 | 21.3 |

The reduction in smoke for both Terpolymer X and Y with hydrated kaolin compared to PVC is substantial. Further, a high percent char is noted for both Terpolymer X and Y with hydrated kaolin is noted. Higher amounts of char are desired because this inhibits flame spread.

The Aropahoe Smoke Chamber is well known to the art, see, e.g. Plastics Technology, March, 1976.

EXAMPLE 6

The terpolymer of Run 1 of Example 1, and a 50/50 physical mixture of PVC and the same EVA copolymer used in Run 1 (55% ethylene/45% vinyl acetate) were each blended with the same additives to compare the properties of the graft terpolymer with the physical mixture. The oxygen index and smoke and soot generation were determined as in Example 2. The results are reported in Table XI below. The additives were used as follows:

EXAMPLE 6

The terpolymer of Run 1 of Example 1, and a 50/50 physical mixture of PVC and the same EVA copolymer used in Run 1 (55% ethylene/45% vinyl acetate) were each blended with the same additives to compare the properties of the graft terpolymer with the physical mixture. The oxygen index and smoke and soot generation were determined as in Example 2. The results are reported in Table XI below. The additives used were as follows:

|  | Parts per hundred Parts of Resin |
| --- | --- |
| Stabilizer* | 5 |
| Lubricant* | 0.25 |
| Anti-oxidant* | 2 |
| Color concentrate* | 2 |
| Antimony trioxide | 3 |
| Hydrated kaolin | 30 |

*same as in Example 1.

TABLE XI

Comparison of Terpolymer and Blend

| Properties | Graft Terpolymer | 50/50 Blend |
| --- | --- | --- |
| Original |  |  |
| Tensile Strength (psi) | 1965 | 490 |
| Elongation (%) | 250 | 200 |
| 100% Modulus (psi) | 1950 | 490 |
| Aged 7 days at 158° C. |  |  |
| Tensile Strength (psi) | 2755 | melted |
| Elongation (%) | 135 | " |
| T.S. Retention (%) | 140 | " |
| Elong. Retention (%) | 54 | " |
| Aged 18 hrs at 121° C. in oil |  |  |
| Tensile Strength (psi) | 1105 | melted |
| Elongation (%) | 140 | " |
| T.S. Retention (%) | 56 | " |
| Elong. Retention (%) | 56 | " |
| Brittle Point (°C.) | −30 | −12 |
| Deformation at 136° C., |  |  |
| 2000 g. wt. (%) | 33 | 97.5 |
| Oxygen Index | 35 | 31.5 |
| Smoke | S | G |
| Soot | S | G |

These data show that the present invention provides a elastomeric thermoplastic with excellent low temperature properties, thermal stability at high temperatures, low flammability and excellent weatherability. On examination, the terpolymer has a rubbery feel and is flexible without plasticizers that can migrate. In comparison, the physical blend is stiff, unstable and smokes badly. Based on the data of Table XI, it can be seen that the terpolymer composition of the invention is similar to fluorinated polymers in properties.

What is claimed:

1. A polymeric composition, comprising
   (1) a graft terpolymer of:
      (a) from about 40 to about 60 parts by weight of a mixture from about 85 to about 100% by weight of vinyl chloride and from 0 to about 15% by weight of a copolymerizable monomer; graft copolymerized to
      (b) from about 60 to about 40 parts by weight of a solid ethylene-vinyl acetate copolymer containing from about 15 to about 95% by weight of combined ethylene and the balance vinyl acetate; and
   (2) from about 5 to about 100 parts by weight, per hundred parts by weight of the graft terpolymer, of a flame retardant, smoke and soot-inhibiting filler selected from the group consisting of kaolin, talc, silica or alumina.

2. The composition according to claim 1, wherein the amount of said filler is from about 50 to about 100 parts by weight per hundred parts by weight of said graft terpolymer 3. The composition according to claim 2, wherein said filler is hydrated kaolin.

4. The composition according to claim 1, which comprises from about 0.1 to about 20 parts by weight, per hundred parts by weight of said graft terpolymer, of a flame retardant.

5. The composition according to claim 4, wherein the amount of said flame ratardant is from about 1 to about 10 parts by weight per hundred parts by weight of said graft terpolymer.

6. The composition according to claim 5, wherein said filler is hydrated kaolin.

7. The composition according to claim 4, wherein the amount of said hydrated filler is from about 10 to about 80 parts per hundred parts of said graft copolymer.

8. The composition according to claim 7, wherein said flame retardant is an antimony oxide in an amount of from about 2 1 to about 10 parts by weight per hundred parts by weight of said graft terpolymer.

9. The composition according to claim 8, wherein said filler is hydrated kaolin and said flame retardant is antimony trioxide.

10. The composition according to claim 4, wherein said flame retardant is selected from the group consisting of chlorinated or brominated hydrocarbons, halogenated or non-halogenated organophosphorous compounds, antimony compounds, zinc compounds and molybdenum compounds.

11. The composition according to claim 1, wherein said terpolymer contains 47% EVA copolymer (55% ethylene-45% vinyl acetate) and 53% PVC, 50% EVA copolymer (48% ethylene-52% vinyl acetate) and 50% PVC, or 57% EVA copolymer (48% ethylene-52% vinyl acetate) and 43% PVC.

12. The composition according to claim 1, wherein said filler is hydrated kaolin.

13. The composition according to claim 1, wherein said filler is calcined kaolin.

14. The composition according to claim 1, wherein said filler is talc.

15. The composition according to claim 1, wherein said filler is silica.

16. The composition according to claim 1, wherein said filler is alumina.

* * * * *